United States Patent [19]

Adolph

[11] Patent Number: 4,736,620
[45] Date of Patent: Apr. 12, 1988

[54] MAGNETOSTRICTIVE ELEMENT FOR MEASURING KNOCK IN ENGINES

[75] Inventor: Norbert Adolph, Aachen, Fed. Rep. of Germany

[73] Assignee: FEV Forschungsgesellschaft für Energietechnik und Verbrennungsmotoren GmbH, Aachen, Fed. Rep. of Germany

[21] Appl. No.: 882,360

[22] Filed: Jul. 7, 1986

[30] Foreign Application Priority Data

Jul. 4, 1985 [DE] Fed. Rep. of Germany ....... 3523893

[51] Int. Cl.⁴ .......................................... G01L 23/22
[52] U.S. Cl. .................... 73/35; 73/DIG. 2
[58] Field of Search .................. 73/35, 115, DIG. 2; 310/26

[56] References Cited

U.S. PATENT DOCUMENTS 2,414,457 1/1947 Eldredge et al. .............. 73/DIG. 2
3,089,333 10/1960 Kleesattel .......................... 73/661
4,091,656 5/1978 Altemose ............................. 73/35
4,461,178 7/1984 Chamuel ............................. 73/599

Primary Examiner—John Chapman
Attorney, Agent, or Firm—Watson, Cole, Grindle & Watson

[57] ABSTRACT

A method and device for measuring combustion knocking in the combustion chamber of an externally-ignited internal combustion engine, the device comprising a magnetostrictive element with a maximum diameter of 2 mm and a length-to-diameter ratio of greater than 100, the device being mounted in the engine so as to be exposed to the combustion chamber. The device can include a coil to which the magnetostrictive element is connected for converting changes in magnetic conductability in the magnetostrictive element, due to pressure increases in the combustion chamber to which it is exposed, into electrical signals. The coil in turn can be connected to an electronic switching system for the engine.

19 Claims, 4 Drawing Sheets

MAGNETOSTRICTIVE ELEMENT FOR MEASURING KNOCK IN ENGINES

The present invention relates to method for measuring and evaluating knocking during combustion in the operation of an externally-ignited internal combustion engine. More specifically, the invention measures a physical magnitude in the combustion chamber which changes during combustion knocking and passes the measurement to a processing apparatus, as well as a device for the implementation of this method.

BACKGROUND OF THE INVENTION

Combustion in a reciprocating internal combustion engine first of all starts at normal flame velocity. When, at full load, the pressure in the combustion chamber reaches the maximum of approximately 60 bar, about 70–90% of the introduced fuel has been consumed. At this point, fuel mixture components which are still unburned and at some distance from the spark plug, can burn at these high pressure and temperature levels by means of self-ignition which is comparable to the mode of combustion occurring in a diesel engine. However, in a diesel engine, self-ignition is desired for initiating combustion while in an externally-ignited combustion engine, self-ignition, which occurs toward the end of the normal combustion process, is not desired.

Self-ignition toward the end of the normal combustion process is generally designated as "knocking". During knocking, the peak pressure, which at the time of the self-ignition is approximately 60 bar, has a rapid pressure jump superimposed on it. The magnitude of the pressure jump depends on the mixture mass combusted by self-ignition. With very weak knocks, it may be a few tenths of a bar and, with very strong knocks, more than 100 bar. Due to this pressure jump, two effects are initiated in the combustion chamber. The first effect is purely acoustic because every combustion chamber represents an acoustic, vibratable construction which can be excited to self-resonance through sufficiently rapid pressure interference. At the speed of sound in the combustion chamber at the time of combustion (just less than about 1000 m/sec), these self-resonances are in the range of 7000–25,000 Hz, with the lower resonances around 7000 Hz being dominant. These are the audible frequencies which are also known as "ringing."

For a long time, the theory has been that there are various types of knocking, e.g., knocking at low rpms which occurs during acceleration, and knocking at high rpms and higher loads which occurs under conditions of sustained full acceleration. From a thermodynamic point of view, however, both types of knocking are one and the same. The concept of high-velocity knocking merely indicates that the knocking occurs at higher velocities, so that it can no longer be heard due to the noise of the engine. Consequently, there is then the danger that if knocking continues for a sustained period of time, engine damage will result. Acceleration knocking on the other hand only occurs during a few seconds at the time of acceleration and is generally harmless due to its short duration.

In addition to these low-frequency effects, high-frequency effects also occur during knocking generated by self-ignition. These high frequency effects have thus far hardly been investigated. Schlieren photographs of the combustion chamber of the internal combustion engine lead to the suspicion that shock waves are generated.

A shock wave is a steep pressure wave in a closed area whose steepness is caused by the fact that the speed of sound in the shockwave is no longer constant throughout. This is in contrast to purely acoustical effects where it is assumed that the speed of sound will remain temporally and spatially constant and will not change as the result of the minimal changes in pressure. This limitation is obviated in shock waves because the speed of sound becomes greater at higher pressure, i.e., in the area of high pressure, a pressure wave will run more rapidly than in an area of low pressure. This means that a wave originally in sinusoidal form will cause a very steep pressure jump to occur. Such a jump contains very high frequency components, which is in contrast to the purely sinusoidal wave which contains only the frequencies corresponding to the wave-length. Since very steep pressure jumps, being very high-frequency effects, no longer obey the classical laws of acoustics, the expansion velocity can become considerably higher than the speed of sound, and this effect is designated as a shock wave.

According to the current state of technical knowledge, it is simply known that, during knocking, damage is caused to engine parts and that the extent of damage is related to the intensity of the knocking. However, it is not known for certain which physical events occurring in the combustion chamber are responsible for the damage. There have been indications that it is not the acoustical knock vibrations, i.e., the audible lower-frequency knock vibrations, which are responsible for the damage, but rather the damage is exclusively due to the shock waves generated and the high-frequency compressional vibrations which they cause.

U.S. Pat. No. 2,414,457 to Eldridge et al discloses a device for ascertaining rapid pressure changes in the combustion chamber of an internal combustion engine. Such a device allows the measurement of a voltage which is representative of the level, rapidity of change and other characteristic properties of these pressure changes. The measurement is accomplished by means of a rod made of magnetostrictive material consisting of an alloy of about 52% nickel, about 48% iron and small quantities of other materials. The changes of magnetic flow occurring in this rod due to pressure changes are transformed into voltage signals in a coil, and such generated signals may then be processed further.

This device, however, is not suitable for measuring in a precise manner those types of knocking which lead to engine damage in high-performance operation. This may be due to the fact that the magnetostrictive receiver of the known type device has a relatively large receptive surface in relation to the size of the combustion chamber. As a consequence, when high-frequency pressure changes occur and/or shock waves impact on the receptive surface, an integrative effect occurs which does not permit exact measurement of the type, velocity, frequency, amplitude, etc., of the pressure change occurring.

In addition, magnetostrictive receivers of the known type have a relatively short length, such that the relationship of the length to the diameter of the receiver is relatively small. In the above-mentioned patent, this length to diameter relationship has an approximate value of 30, which causes additional non-exactnesses in measurement.

SUMMARY OF THE INVENTION

Accordingly, it is an object of the present invention to provide a method for measuring combustion knocking where those operational conditions of knocking which lead to damage at higher operational levels of the engine will be directly ascertained.

In accordance with the present invention, pressure changes occurring during knocking which have frequencies of greater than 100 kHz are traced, measured, and passed to a processing device by means of a magnetostrictive element having a maximum diameter of 2 mm and a length-to-diameter ratio of greater than 100.

Also, according to the present invention, pressure increases occurring during knocking which exceed 1 bar/microsecond are traced, measured, and passed to a processing device by means of a magnetostrictive element with a maximum diameter of 2 mm and a length-to-diameter ratio of more than 100.

According to a preferred embodiment of the present invention, the combustion chamber end of the magnetostrictive element is located in the combustion wall such that the element is acoustically decoupled from the wall, i.e., so that the element does not participate in the vibration of the wall or only to a minimal degree.

Further objects, advantages and features of the present invention will become more fully apparent from a detailed consideration of the arrangement and construction of the constituent parts as set forth in the following description, taken together with the accompanying drawing.

DETAILED DESCRIPTION OF THE PREFERRED EMBODIMENT

Figure 1:
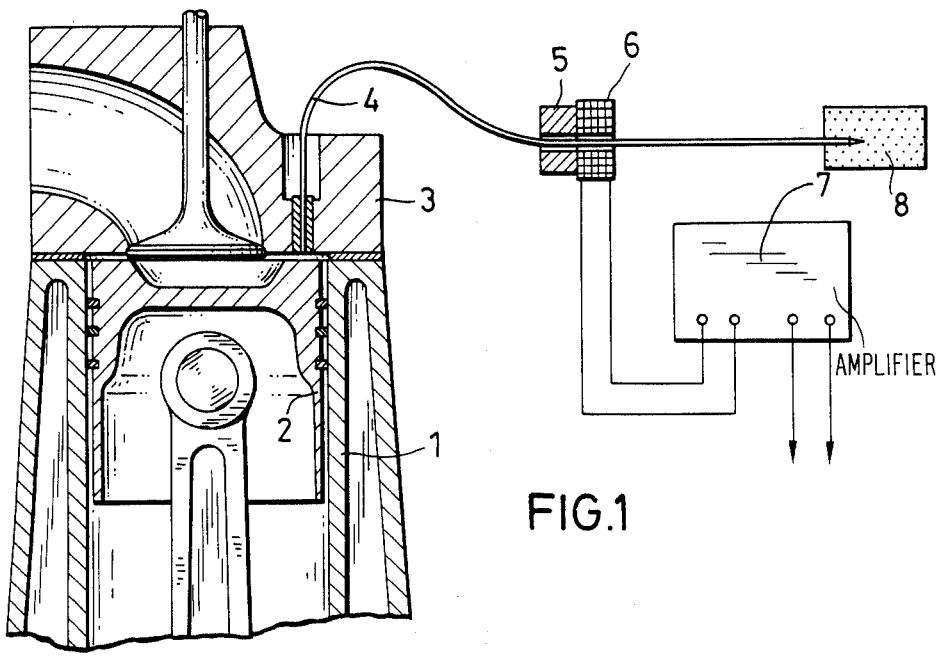
FIG. 1 schematically shows a measurement device for use in the method of the present invention.
Figure 1A:
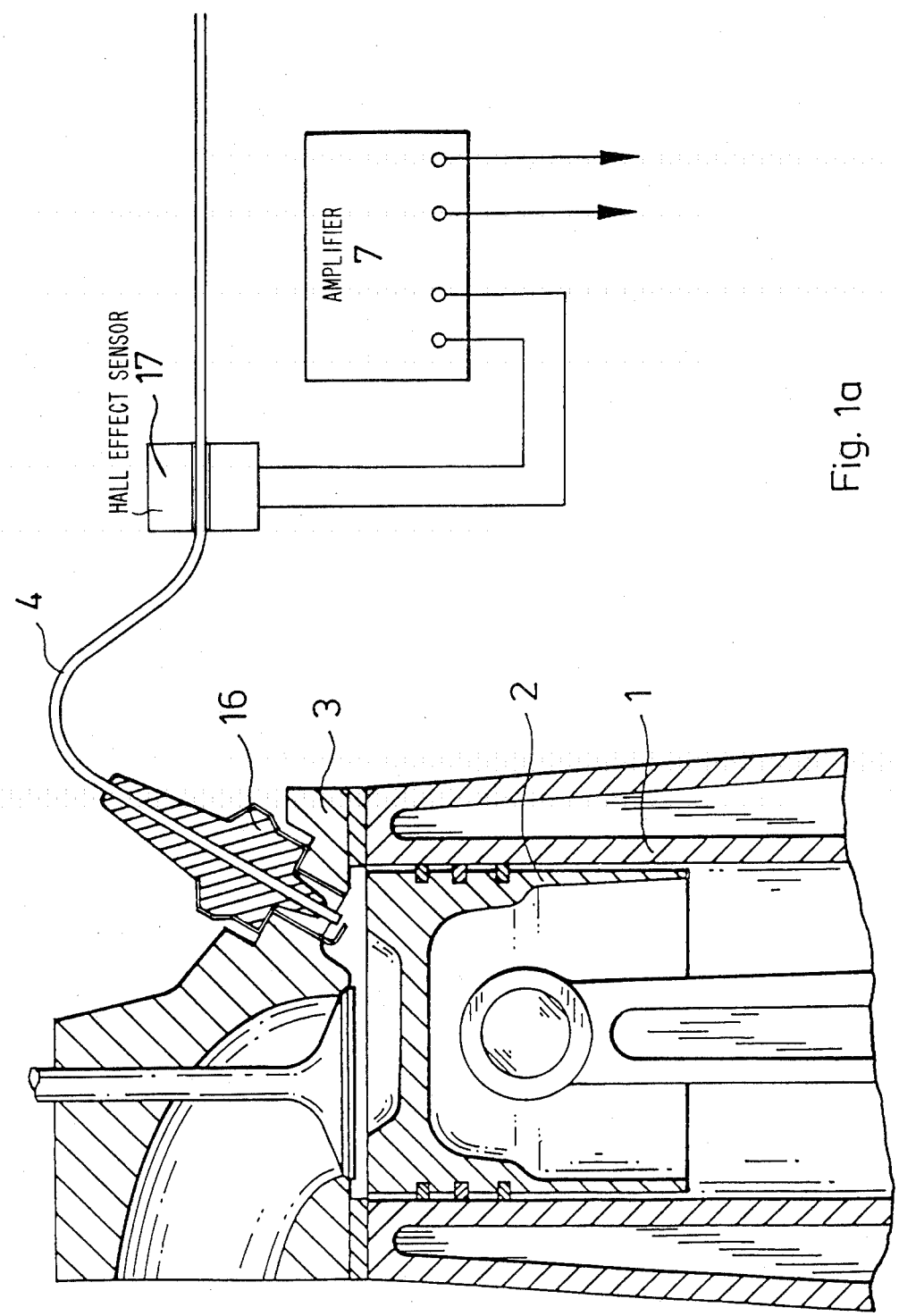
FIGS. 1a and 1b show alternative embodiments of the measurement device, FIG. 2 diagrams the pressure effects and the initiation signal of the measurement device during a knock simulation, and FIG. 3 schematically shows the measurement device for use in a multicylinder engine.
Figure 1B:
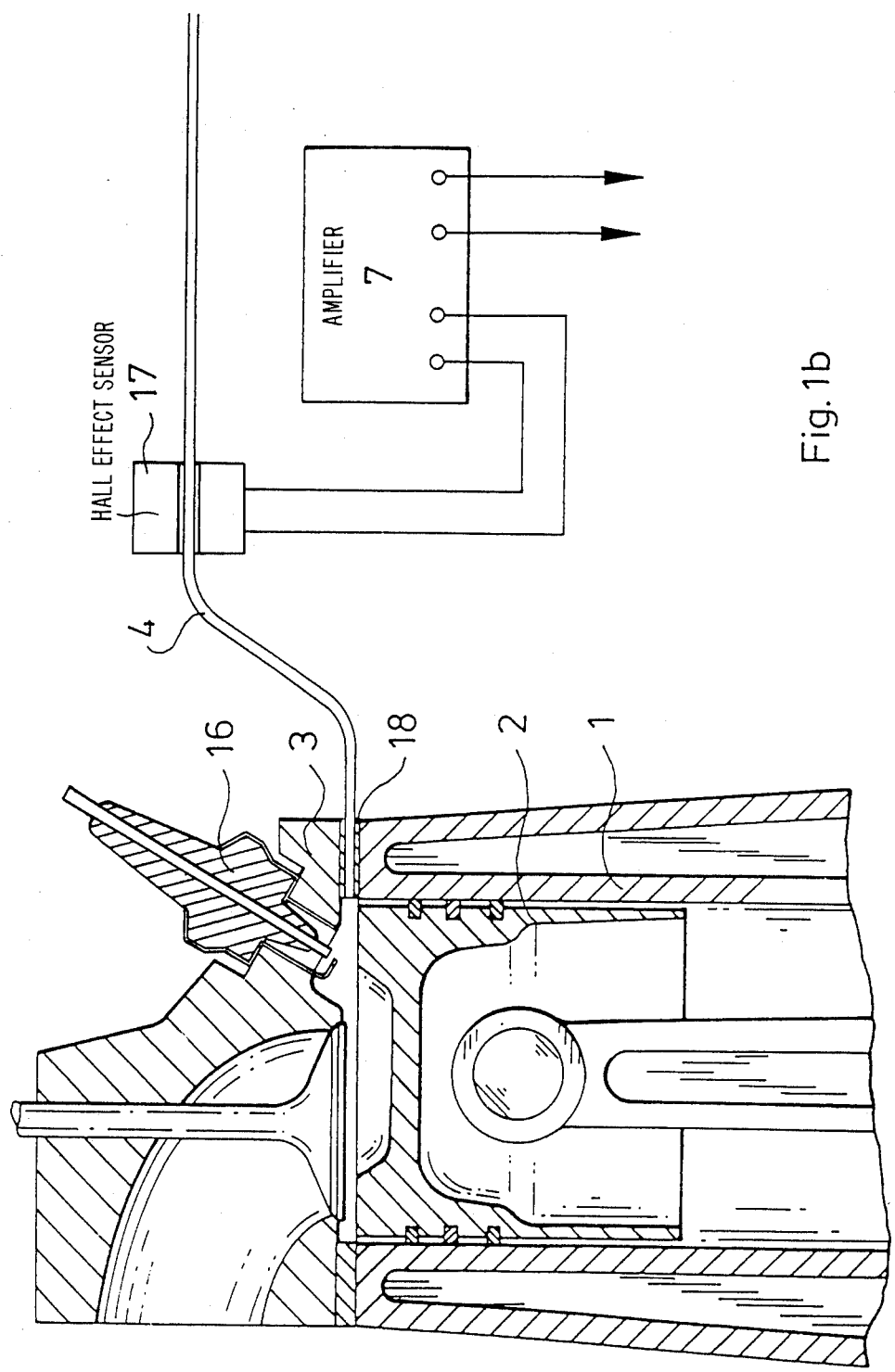

Shown in FIG. 1 is a portion of an externally ignited internal combustion engine having cylinder 1, piston 2 and cylinder head 3. Steep pressure increases and/or high-frequency compressional vibrations which occur during knock situations in the engine are traced and measured by magnetostrictive element 4. The magnetostrictive element 4 may be a nickel wire which is mounted in cylinder head 3 so as to directly or at least indirectly be subjected to the pressure vibrations within the combustion chamber. Thus, magnetostrictive element 4 is coupled to the combustion chamber such that shock waves are fed into the element and generate an expansion wave in the nickel wire which expands in an axial direction at the speed of sound. Since nickel is magnetostrictive, the expansion wave generates an electric voltage in coil 6 which is in a magnetic field generated by permanent magnet 5, and, after corresponding broad-band amplification, generates an output signal of approx. 0.1 V in broad-band amplifier 7. A semiconductor element such as a Hall element 17 in FIGS. 1a and 1b could be used as a sensor in place of the coil.

It is of essential importance in terms of the present invention that magnetostrictive element 4 has a maximum diameter of 2 mm and a length to diameter ratio of more than 100 in order to measure the pressure changes which occur during knocking which have frequencies of higher than 100 kHz, or which are greater than 1 bar/microsecond. Thus the length of magnetostrictive element 4 from the surface which is subjected to internal pressure of the combustion chamber to coil 6 is greater than 200 mm. Preferably, the diameter of magnetostrictive element 4 is 0.5 mm and its length is about 2000 mm, such that the length-diameter ratio is about 4000.

In addition, preferably the cross section of the portion of magnetostrictive element 4 which is subjected to the internal pressure of the combustion chamber is point-shaped. It is also advantageous in the present invention to acoustically decouple this portion from the surrounding combustion chamber wall, i.e., to insure by appropriate means that the portion does not participate in the vibrations of the neighboring wall portions. Decoupling can be accomplished particularly advantageously by corresponding separation of the surrounding material if the magnetostrictive element is attached in or onto a spark plug 16 in FIG. 1a, or in or onto the combustion chamber enclosure of the cylinder head seal 18 in FIG. 1b. Thus, an acoustic impedance jump is created between the receiving end of the magnetostrictive element and the surrounding material.

Figure 2:
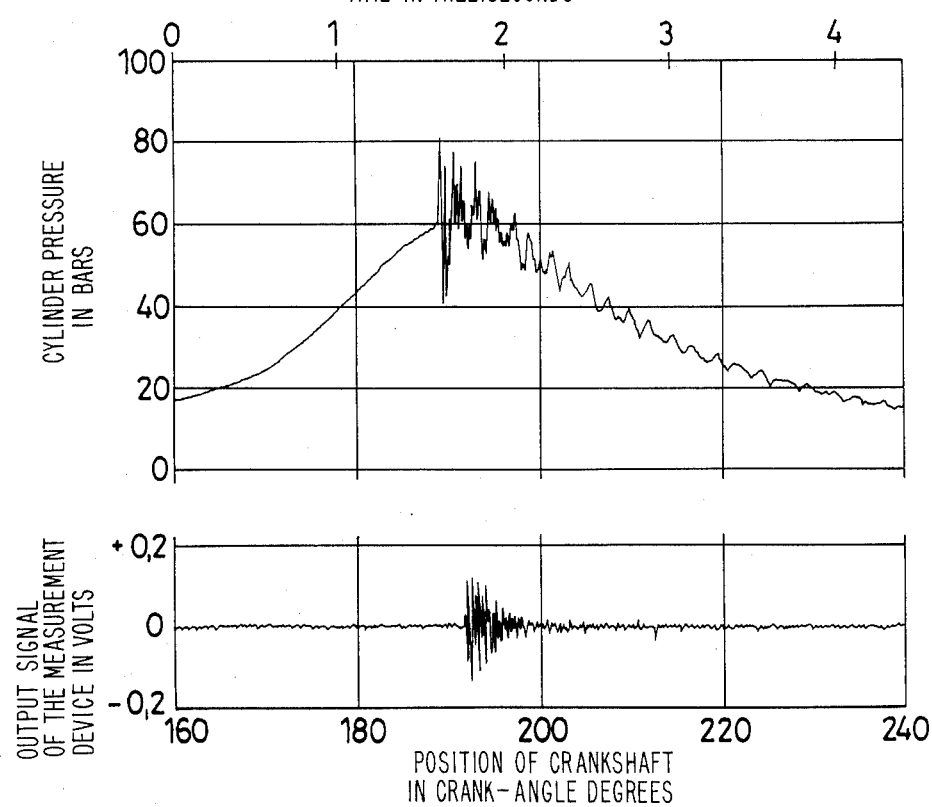

In the simulation represented in the top portion of FIG. 2, the relationship of cylinder pressure (bar) versus time (milliseconds) is shown, the pressure being the ordinate axis. The lower portion of FIG. 2 shows the relationship between the output signal of the measurement device (volts) and the position of a crankshaft (crank angle degrees), the output signal being the ordinate axis. The simulation has a compressional vibration amplitude of approx. ±20 bar, and the nickel-wire element provides a voltage of approx. ±0.1 V. The cylinder pressure exhibits clearly ascertainable high-frequency components above the level of the chamber resonance. The frequency of the microphone signal is approx. 800 kHz and contains no significant portions below 100 kHz.

High-frequency shock-waves could not, until now, be measured with available means. Even pressure sensors such as those which are currently in use in motor measurement technology are unsuitable for such high-frequency measurements. Quartz pressure sensors with a natural frequency are too sensitive in spite of expensive protective measures to be operationally effective as knock sensors. In addition, the frequency range of these sensors has an upper limit of approx. 250 kHz. Prior to the present invention, there has been no method known in engine measurement technology with which shock waves could be satisfactorily ascertained except with the very expensive procedure of a Schlieren-photographic investigation which requires a special engine with translucent windows.

The present invention provides the capability of definitely avoiding the damaging knocking, i.e., the mechanical damage caused by knocks, by measuring the knocks and appropriately controlling and regulating the engine in terms of its properties, characteristics, and operational behavior so that damaging knocking no longer occurs.

One mode of avoiding damaging knocking is as follows: A thin nickel magnetostrictive wire is connected with the combustion chamber, one end being at the combustion chamber. The diameter of the wire must be small in relation to the wave length pertaining in the combustion chamber. The wire should therefore preferably have a diameter in the order of magnitude of 0.5 mm, but in any case less than 2 mm. Nickel is used as a component of the wire because nickel is a magnetostrictive material which allows measurements of the type contemplated. When shock wave occurs in the combustion chamber, the wave excites an expansion wave in the nickel containing wire. The propagation of an expansion wave can only occur with a shock wave, and not with a lower-frequency event, because the necessary energy density is absent. The expansion wave reproduces itself in the wire at the speed of sound in nickel. The expansion wave is a longitudinal wave, not an actual vibration, and is a one-time wave which can, however, have a high-frequency harmonic oscillation superimposed upon it. This superimposition often occurs because the excitation also again represents a vibration process. The expansion wave generates a change in the magnetic conductability of the magnetostrictive material, which change can be sensed by a coil acting as a sensor. For the change of magnetic conductability in the nickel wire to be sensed by coil 6, it is important that the coil be designed and installed so as to be capable of sensing the very rapid changes in the nickel wire since frequencies of approx. 1 million vibrations per second may be generated.

Nickel wire 4 must be of the length provided for the present invention since the expansion wave is reflected at the end of this wire, and then arrives again, in weakened form, at the coil, where it generates a second signal. In order to strongly restrict the reflection, it is sufficient to sharpen the end of the nickel wire to a point. An even better result may be achieved by stretching it between two plates made of a synthetic material, or form-pouring it into a soft synthetic material. This material 8 in FIG. 1 can be a plastic and/or elastic material. The length of the wire should be such that the reflected signal does not interfere with the actual signal. The wire may also be coiled to form a tiny spool.

It is possible to install one or more nickel wires for each cylinder, such that all the wires work together with separate receiver coils and separate electronic switching systems. It may also be advantageous, however, to pass all wires through a common spool or coil. The signals from the cylinders can be separated from one another due to the ignition sequence of the engine, since it is only immediately after the electrical ignition, i.e., during actual combustion, that knocking can occur and microphone signals from the wire can be present. The signals of several cylinders may be separated from one another by temporal checking of the spool.

Figure 3:
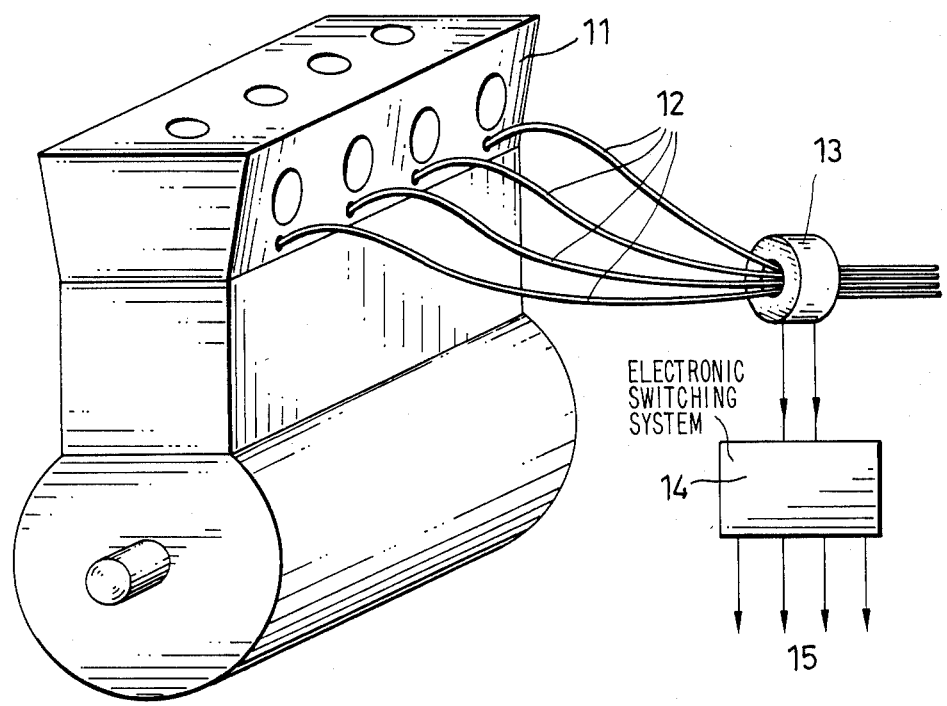

An example of such an embodiment is shown in FIG. 3 which, in simplified form, shows a measurement device according to the invention adapted for use with a four cylinder engine. One magnetostrictive element 12 for each cylinder, preferentially nickel wires, pass out from cylinder head 11 and through mechanical-electrical transformer 13. In mechanical-electrical transformer 13, the expansion waves are transformed into electrical quantities, e.g., voltages or currents. Since knocking in the various cylinders occurs at different times corresponding to the ignition sequence of the engine, a single mechanical-electrical transformer 13 can be used for all the magnetostrictive signals from the various cylinders. The electrical signals thus obtained are further processed in electronic switching system 14, and, if desired, stored. The output signals of the electronic switching system 14 are passed by wires 15 to the control and regulation devices for the engine e.g., devices regulating ignition, mixture formation, loading and the like.

While there has been shown and described what is considered to be preferred embodiments of the present invention, it will be apparent to those skilled in the art that various changes and modifications may be made therein without departing from the invention as defined in the appended claims.

It is claimed:

1. A method for measuring and evaluating combustion knocking during operation of an externally-ignited combustion engine having a combustion chamber in which a physical magnitude changes during combustion knocking, the method comprising providing a magnetostrictive element having a maximum diameter of 2 mm and a length-to-diameter ratio of more than 100 in communication on with the combustion chamber, measuring pressure changes occurring during knocking which have frequencies of greater than 100 kHz with the magnetostrictive element, and transferring such measurements to a processing apparatus for the engine.

2. A method for measuring and evaluating combustion knocking during operation of an externally-ignited combustion engine having a combustion chamber in which a physical magnitude changes during combustion knocking, the method comprising providing a magnetostrictive element having a maximum diameter of 2 mm and a length-to-diameter ratio of more than 100 in communcation on with the combustion chamber, measuring pressure increases occuring during knocking which are greater than 10 bar/microsecond with the magnetostrictive element, and transferring such measurements to a processing apparatus for the engine.

3. A device for measuring combustion chamber in a combustion chamber of an externally-ignited combustion engine during operation thereof, the device comprising a magnetostrictive element with a maximum diameter of 2 mm and a length-to-diameter ratio of greater than 100, and having an end for exposure to said combustion chamber, and a vibration-decoupling material around said end of said magnetostrictive element for decoupling said magnetostrictive element from vibrations in the walls of said combustion chamber.

4. A device according to claim 3, wherein said magnetostrictive element has a circular cross section and is generally cylindrical in shape.

5. A device according to claim 3, wherein said magnetostrictive element has a cross section which is not uniform along its length.

6. A device according to claim 5, wherein said end of said magnetostrictive element is pointed.

7. A device according to claim 3, wherein said magnetostrictive element contains nickel.

8. A device according to claim 3, wherein the other end of the magnetostrictive element is embedded in a material for restricting reflection of an expansion wave.

9. A device according to claim 3, further including an apparatus connected to said magnetostrictive element, said apparatus converting changes in magnetic conductability occurring in said magnetostrictive element into electrical signals.

10. A device according to claim 9, wherein said apparatus includes a coil.

11. A device according to claim 10, wherein said coil is premagnetized.

12. A device according to claim 9, wherein said apparatus includes a semiconductor element which works together with said magnetostrictive element.

13. A device according to claim 12, wherein said semiconductor element includes a Hall element.

14. An externally-ignited internal combustion engine comprising a combustion chamber comprising a cylinder, a device for measuring a physical magnitude in said chamber which changes during combustion knocking, and a processing apparatus for said device, the device including a magnetostrictive element with a maximum diameter of 2 mm and a length-to-diameter ratio of more than 100.

15. An engine according to claim 14, wherein an end of the magnetostrictive element is in a wall of the combustion chamber, the element being acoustically decoupled from the wall.

16. An engine according to claim 15, wherein the magnetostrictive element is installed in a spark plug projecting into the combustion chamber.

17. An engine according to claim 15, wherein the magnetostrictive element is installed in the combustion chamber at a head seal for the cylinder.

18. An engine according to claim 14, having a plurality of combustion chambers, and wherein said device includes a plurality of magnetostrictive elements, at least one magnetostrictive element being associated with each of said plurality of combustion chambers to measure changes in physical magnitude therein.

19. An engine according to claim 18, wherein said device includes a common apparatus connected to all of said plurality of magnetostrictive elements for converting changes in magnetic conductability occurring in each of said plurality of magnetostrictive elements into electrical signals.

* * * * *